(12) United States Patent
Hwu et al.

(10) Patent No.: US 9,077,037 B2
(45) Date of Patent: Jul. 7, 2015

(54) ELECTRODE AND ELECTROLYTE MATERIALS FOR BATTERIES

(75) Inventors: Shiou-Jyh Hwu, Clemson, SC (US); Gregory A. Becht, Wilmington, DE (US)

(73) Assignee: CLEMSON UNIVERSITY, Clemson, SC (US)

(*) Notice: Subject to any disclaimer, the term of this patent is extended or adjusted under 35 U.S.C. 154(b) by 766 days.

(21) Appl. No.: 13/201,238

(22) PCT Filed: Feb. 12, 2010

(86) PCT No.: PCT/US2010/023980
§ 371 (c)(1),
(2), (4) Date: Oct. 25, 2011

(87) PCT Pub. No.: WO2010/093844
PCT Pub. Date: Aug. 19, 2010

(65) Prior Publication Data
US 2012/0082902 A1 Apr. 5, 2012

Related U.S. Application Data

(60) Provisional application No. 61/152,346, filed on Feb. 13, 2009.

(51) Int. Cl.
*H01M 4/131* (2010.01)
*H01M 4/58* (2010.01)
(Continued)

(52) U.S. Cl.
CPC ............ *H01M 4/5825* (2013.01); *H01M 4/131* (2013.01); *H01M 4/1391* (2013.01); *H01M 10/052* (2013.01); *H01M 10/0562* (2013.01); *Y02E 60/122* (2013.01)

(58) Field of Classification Search
None
See application file for complete search history.

(56) References Cited

U.S. PATENT DOCUMENTS 5,435,874 A  7/1995  Takeuchi et al.
5,910,382 A  6/1999  Goodenough et al.
(Continued)

OTHER PUBLICATIONS

Al-Mamouri, et al., "Synthesis and Structure of the Calcium Copper Oxyfluoride, $Ca_2CuO_2F_{2+\delta}$," *J. Mater. Chem.* 1995, 5 (6), 913-916.
(Continued)

*Primary Examiner* — Jeremiah Smith
(74) *Attorney, Agent, or Firm* — Dority & Manning, P.A.

(57) ABSTRACT

Disclosed are open-framework solids that possess superior ion-transport properties pertinent to the electrochemical performance of next-generation electrode materials for battery devices. Disclosed compounds including compositions and architectures relevant to electrical energy storage device applications have been developed through integrated solid-state and soft (solution) chemistry studies. The solids can adopt a general formula of $A_xM_y(XO_4)_z$, where A=mono- or divalent electropositive cations (e.g., $Li^+$), M—trivalent transition metal cations (e.g., $Fe^{3+}$, $Mn^{3+}$), and X=Si, P, As, or V. Also disclosed are oxo analogs of these materials having the general formulae $A_aM_bO_c(PO_4)_d$ ($a \geq b$), and more specifically, $A_nM_nO_{3x}(PO_4)_{n-2x}$, where A=mono- or divalent electropositive cations (e.g., $Li^+$), M is either Fe or Mn, and x is between 0 and n/2.

5 Claims, 7 Drawing Sheets

(51) Int. Cl.
*H01M 4/1391* (2010.01)
*H01M 10/052* (2010.01)
*H01M 10/0562* (2010.01)

(56) References Cited

U.S. PATENT DOCUMENTS

| | | | |
|---|---|---|---|
| 6,514,640 B1 | 2/2003 | Armand et al. | |
| 2002/0061274 A1* | 5/2002 | Hosoya et al. | 423/306 |
| 2004/0202938 A1* | 10/2004 | Noguchi et al. | 429/231.95 |
| 2007/0292747 A1 | 12/2007 | Chiang et al. | |

OTHER PUBLICATIONS

Andersson, et al., "Lithium insertion into rhombohedral Li3Fe(PO4)3," *Solid State Ionics*, (2001), vol. 140, p. 63-70.

Becht, et al., "Ion exchange and electrochemical evaluation of the microporous phosphate Li9Fe7(PO4)10," *Materials Research Bulletin* (2008), vol. 43, p. 3389-3396.

Becht, et al., "Hydrothermal Ion Exchange on Submillimeter-Size Single Crystals of a New Iron(III) Phosphate," *Chem. Mater*, 2006, 18, 4221-4223.

Ellis, et al., "A Multifunctional 3.5 V Iron-based Phosphate Cathode for Rechargeable Batteries," *Nat. Mater*. 2007, 6, 749-753.

Huang, et al., "High-Rate LiFePO$_4$ Lithium Rechargeable Battery Promoted by Electrochemically Active Polymers," *Chem. Mater*. 2008, 20, 7237-7241.

Kishore et al., "Topotactic insertion of lithium in the layered structure Li4VO(PO4)2; The tunnel structure Li5VO(PO4)2," *Journal of Solid State Chemistry* (2008) 181, p. 976-982.

Kishore, et al., "Synthesis and electrochemical properties of a new vanadyl phosphate: Li4VO(PO4)2," *Electrochemistry Communications* (2006), vol. 8, p. 1558-1562.

European Search Report for PCT/US2010/023980 dated May 21, 2010.

* cited by examiner

ELECTRODE AND ELECTROLYTE MATERIALS FOR BATTERIES

CROSS REFERENCE TO RELATED APPLICATION

The present application is the U.S. Nationalization Application of International Patent Application Number PCT/US2010/023980 filed on Feb. 12, 2010 that claims filing benefit of U.S. Provisional Patent Application Ser. No. 61/152,346 having a filing date of Feb. 13, 2009 entitled "Electrode and Electrolyte Materials for Li-ion batteries," which is incorporated herein by reference in its entirety.

FEDERALLY SPONSORED RESEARCH OR DEVELOPMENT

The Federal Government may have rights to the invention disclosed herein pursuant to National Science Foundation (NSF) grant nos. DMR-0322905, and 0706426.

BACKGROUND

New materials for battery applications are in demand to meet the requirements of the next generation of technologies in portable electronics (laptop computers, cell phones, etc.), medical devices, and transportation. Rechargeable Li-ion batteries have enabled several types of consumer electronics to become more powerful while shrinking in size. The underlying goal that has driven materials research in this field is to use lower cost materials while delivering to the marketplace miniaturized, long-life batteries with high performance in terms of mass and volumetric energy densities.

In the development of Li-ion cells, significant advances in intercalation materials have occurred with the realization that oxides give higher capacities than previously utilized sulfides and also high cell voltages. Despite some twenty-plus years of research since the discovery of Li-ion insertion/deinsertion in layered sulfides (or chalcogenides in general), only a limited number of compounds have been employed in lithium battery devices. These include the layered-type $LiCoO_2$ and derivatives based on $LiMn_{1/3}Ni_{1/3}Co_{1/3}O_2$, the 3D spinel $LiMn_2O_4$ compounds, and olivine $LiFePO_4$ phase.

It has been recognized that transition metal (M) polyanion $(XO_4^{n-})$ structures, built from sharing vertex oxygen atoms of $MO_x$ polyhedra and $XO_4$ tetrahedra anions (where X is S, P, or As), offer interesting possibilities. By altering the nature of X, the ionic-covalent character of the M-O bonding can be changed, with the changes attributed to an inductive effect (FIG. 1). Using this information, it has been possible to systematically map and tune transition-metal (TM) redox potentials into the desired high-potential regime. For instance, in the case of the $Fe^{3+}/Fe^{2+}$ redox couples in oxide-based materials, the potential (1.23 V vs $Li/Li^+$) is too close to the $Li/Li^+$ couple, which results in a low cell voltage. However, in the olivine $LiFePO_4$ phase, with the use of the phosphate polyanion $PO_4^{3-}$, the $Fe^{3+}/Fe^{2+}$ redox couples lie at higher potentials than in the oxide form (FIG. 1). With the incorporation of polyanions in the framework formation, the TM redox couples are stabilized, i.e., the potentials are made more positive in favor of cathode applications. These polyanions exhibit strong polarization of the oxygen atoms toward the X cation and subsequently the covalent component of the M-O bond is diminished by the inductive effect. Thus, the reduction potential of $Fe^{3+}/Fe^{2+}$ in state-of-the-art olivine $LiFePO_4$ phase can reach as high as 3.5V vs $Li/Li^+$.

Olivine $LiFePO_4$ is an ionic conductor in which $Li^+$-ion are transported through a pseudo-one-dimensional channel structure. The lithium iron(II) phosphate $LiFePO_4$ phase has the ordered M'MPO$_4$ olivine structure. Iron (M=Fe) is located in the middle of a slightly distorted $FeO_6$ octahedron, and, as shown in FIG. 2, the $FeO_6$ octahedra share corner oxygen atoms to form zig-zag planes with a Fe—O average bond-length higher than expected for an octahedrally coordinated iron in the +2 valence state. Lithium (M'=Li) is located in a second set of octahedral sites but distributed differently: $LiO_6$ octahedra (not shown for clarity) share edges in order to form $LiO_6$ chains running parallel to [001], the channel direction, which generates preferential rapid one-dimensional $Li^+$-ion conductivity. With Li in a continuous chain of edge-shared octahedra on alternate ac planes, a reversible extraction/insertion of lithium from/into these chains would appear to be analogous to the two-dimensional extraction or insertion of lithium in the $LiMO_2$ layered oxides with M=Co, Ni. It is noted that the $PO_4$ tetrahedra bridge adjacent Fe planes in the olivine structure, which constrains the $Li^+$-ion transport pathway; only the Li—O bonding confines the spacing between $MO_2$ layers in the $LiMO_2$ compounds.

Olivine $LiFePO_4$, along with other members of the phospho-olivines $LiMPO_4$ (M=Fe, Mn, Co), have now been extensively studied as positive electrode materials for rechargeable lithium batteries. Unlike mixed-metal oxides, polyanion-based compounds such as those of the phospho-olivines are intrinsic electronic insulators because these compounds structurally adopt a mixed framework that is composed of interlinked $MO_6$ (M=transition metal cation) octahedra with closed-shell, non-magnetic polyanions. Limitation of material performance due to poor electronic conductivity has been improved by material processing through carbon coating (at the expense of lowering especially the volumetric capacity) and miniaturization of nanoparticles.

Downsizing bulk samples into nanometer-size $LiFePO_4$ particles can bypass the slow kinetics, conceivably due to shortened ion/electron diffusion pathways, to improve its low intrinsic electronic/ionic conductivity. However, miniaturized particles can potentially suffer extensive structure defects and cation vacancies, along with inevitable moisture sensitivity on high-surface area particles and low packing density (thus low volumetric capacity), eventually causing capacity fade on continuous cycling.

Recently, researchers have examined the replacement of $O^{2-}$ with more electronegative anions, such as $F^-$, either by means of anion substitution (Ellis, et al., "A Multifunctional 3.5 V Iron-based Phosphate Cathode for Rechargeable Batteries," *Nat. Mater.* 2007, 6, 749-753) or direct fluorination (Al-Mamouri, et al., "Synthesis and Structure of the Calcium Copper Oxyfluoride, $Ca_2CuO_2F_{2+\delta}$," *J. Mater. Chem.* 1995, 5 (6), 913-916) to increase the cell voltage. While anion substitution may result in a structurally distinct host electrode, direct fluorination offers an additional advantage in tuning the redox center by introducing a light, more electronegative anion and maintaining original ion conduction pathways in the host structure. Nevertheless, one of the main drawbacks with using these fluorine-substituted materials is their poor electronic conductivity.

Additionally, direct $Li^+$-ion exchange from single crystals of certain new Fe(II,III)-containing phosphate compounds has been demonstrated (Becht, et al., *Chem. Mater.* 2006, 18, 4221-4223) showing facile ion-transport properties of open-framework solids. The parent compound, for example, was iron(III) phosphate $Cs_{4.65(3)}K_{4.35(1)}Fe_7(PO_4)_{10}$. Single crystals of the parent compound were immersed in $ANO_3$ solutions (A=Li, Na, K, Rb, Cs) and heated to encourage direct ion exchange. The formed plate-like crystals suffered microscopic damage as shown by apparent grooves seen on the surface of crystals. Subsequently, it was found that the structural solution was relatively poor.

While the above describes progress in the art, room for additional improvement exists.

SUMMARY

According to one embodiment, disclosed is a method for forming an electrode or electrolyte material. For instance, the method can include carrying out an ion exchange process on a starting material, the starting material having the formula:

$$A_aM_bO_c(XO_4)_d$$

wherein

A is a mono- or divalent electropositive cation selected from the group consisting of sodium, potassium, rubidium, cesium, silver, magnesium, calcium, strontium, and barium, or $A_a$ is $(Cs_{9-e}K_e)$, M is a trivalent transition metal cation, X is silicon, phosphorus, arsenic, or vanadium, and a, b, c, d, and e are all >0.

According to such a process, the A cation component of the starting material can be exchanged with a smaller cation A* to form a product electrode or electrolyte material having the formula:

$$A^*_aM_bO_c(XO_4)_d$$

wherein the ratio of A* to M in the product is greater than one.

For instance, M can be iron or manganese, the smaller cation A* can be lithium, and/or X can be phosphorus.

In one preferred embodiment, the product electrode or electrolyte material can have the formula:

$$A^*_nM_nO_{3x}(PO_4)_{n-2x}$$

wherein n is greater than 2, and x is greater than 0 and less than or equal to (n/2).

A method can also include forming the starting material. For instance, the starting material can be $Cs_7Fe_7O_2(PO_4)_8$ and the starting material can be formed according to a molten salt solid-state method at a temperature greater than about 600° C. with the following reaction scheme:

$$7SrO+7Fe_2O_3+4P_4O_{10}+(CsCl/CsI\ flux) \rightarrow 2Cs_7Fe_7O_2(PO_4)_8+\text{side products}.$$

Also disclosed is a method for forming an electrode or electrolyte material in which an ion exchange process is carried out on a polycrystalline starting material, the polycrystalline starting material having the formula:

$$A_aM_b(XO_4)_c$$

wherein

A is a mono- or divalent electropositive cation selected from the group consisting of sodium, potassium, rubidium, cesium, silver, magnesium, calcium, strontium, and barium, or $A_a$ is $(Cs_{9-d}K_d)$, M is a trivalent transition metal cation, X is silicon, phosphorus, arsenic, or vanadium, and a, b, c, and d are all >0.

The ion exchange process exchanging the A cation component of the starting material with a smaller cation A* to form a product electrode or electrolyte material having the formula:

$$A^*_aM_b(XO_4)_c$$

wherein the ratio of A* to M in the product is greater than one.

For instance, M can be iron or manganese, the smaller cation A* can be lithium, and/or X can be phosphorus.

Also disclosed are electrode or electrolyte materials that can, in one embodiment, be formed according to the disclosed methods.

BRIEF DESCRIPTION OF THE FIGURES

The presently disclosed subject matter may be better understood with reference to the Figures, of which.

DETAILED DESCRIPTION

Figure 1:
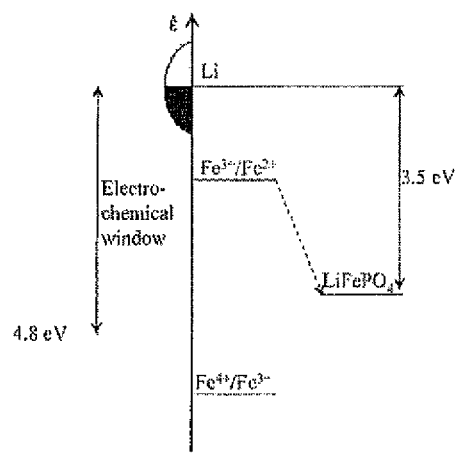
FIG. 1 illustrates the energy diagram showing the $Fe^{4+}/Fe^{3+}$ and $Fe^{3+}/Fe^{2+}$ potentials in cathode materials based on iron in octahedral coordination.
Figure 2:
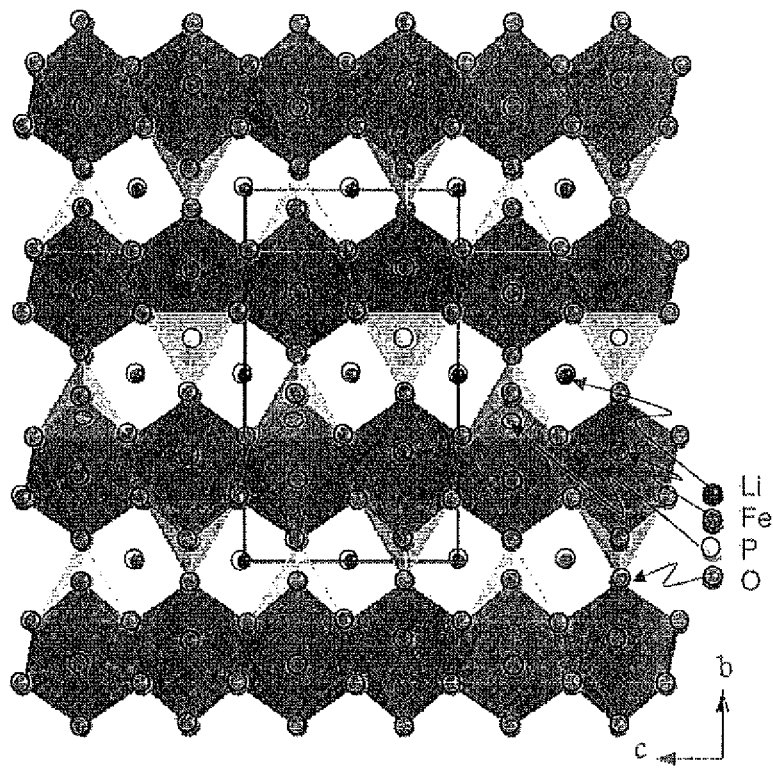
FIG. 2 is a polyhedral representation of the olivine $LiFePO_4$ structure showing pseudo-one-dimensional channels where $Li^+$ ions reside.

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made to the disclosed subject matter without departing from the scope or spirit of the disclosure. For instance, features illustrated or described as part of one embodiment may be used with another embodiment to yield a still further embodiment.

In general, the present disclosure is directed to methods to enhance the conductivity of olivine-type compounds through expansion of the dimension (thickness) of the Fe—O (oxo) sublattice that is responsible for electronic conductivity, and/or through enlargement of the size of the open-framework (channel) that facilitates ion transport and, in turn, improves ionic conductivity. Solids possessing channels as well as layered (with van der Waals gap) structures can provide pathways for facile ion-exchange and transport, increasing the capability for such materials to be good ion conductors, and in one preferred embodiment, good $Li^+$ ion conductors. An advantage of structural rigidity, especially seen in channeled frameworks, is small volume expansion/compression upon ion insertion/extraction as the materials cycle between two states. Therefore, the likelihood of severe capacity fade due to damage to the electrode can be low.

Without wishing to be bound by any particular theory, it is believed that selection of electrode materials is based in part on the reversibility of cation insertion/deinsertion processes occurring with a concomitant addition/removal of electrons to/from the host. Structural integrity during the redox cycle plays a crucial rule in a material's performance, and thus is an important screening parameter in developing disclosed electrode systems.

Disclosed materials include open-framework solids that possess superior ion-transport properties pertinent to the electrochemical performance of next-generation electrode materials for battery devices. Disclosed compounds including compositions and architectures relevant to electrical energy storage device applications have been developed through integrated solid-state and soft (solution) chemistry studies.

According to one embodiment, disclosed materials can be formed from crystalline (e.g., polycrystalline) starting compounds that employ larger size mono-($A^+$=$Na^+$, $K^+$, $Rb^+$, $Cs^+$, $Ag^+$) and divalent ($A^{2+}$=$Mg^{2+}$, $Ca^{2+}$, $Sr^{2+}$, $Ba^{2+}$) electropositive cations. Formed starting materials can include iron(III) and manganese(III)-containing compounds with structures that show channeled and layered frameworks. These solids can then be used as precursors for the synthesis of, in one preferred embodiment, Li-containing electrode materials. These solids adopt a general formula of $A_xM_y(XO_4)_z$, where A=mono- or divalent electropositive cations, M—trivalent transition metal cations (e.g., $Fe^{3+}$, $Mn^{3+}$), and X=Si, P, As, or V.

These electropositive polycrystalline parent compounds are susceptible to ion-exchange with smaller cations, e.g., $Li^+$ ions, to form $Li^+$-containing iron- and manganese compounds, $Li_xM_y(XO_4)_z$. Moreover, it is believed that these products can not be prepared by common direct synthesis methods that take place at high temperatures. Disclosed product solids can exhibit superior ion-transport properties, and can be further reduced to Fe(II) and Mn(II) $Li_{x+y}M_y(XO_4)_z$ phases (i.e., discharged cathode materials). For instance, by additional $Li^+$-ion insertion either under controlled hydrothermal conditions or using n-BuLi. Disclosed solids can exhibit high theoretical capacity due to high Li/M (>1) ratios in their chemical formulae which are higher than that of $LiFePO_4$ (where Li/Fe=1). Compared to $LiFePO_4$, disclosed solids can have compatible physical properties in terms of thermal stability and ion transport properties. The presence of discharge and charge states, e.g., $Li_{x+y}M_y(XO_4)_z$ and $Li_xM_y(XO_4)_z$, respectively, makes disclosed solids potential materials for electrode applications.

Also disclosed herein are oxo analogs of these materials having the general formula $A_nM_nO_{3x}(PO_4)_{n-2x}$, where A=mono- or divalent electropositive cations (e.g., Li), M is either Fe or Mn, and x is between 0 and n/2. The analog materials are intercalation compounds for which Li insertion/deinsertion can be coupled to transition metal redox as in $LiMPO_4$. The compositions are termed herein as oxo analogs of the metal phosphates disclosed above (i.e., compounds for which x=zero in the above formula) having a portion of the phosphate anions isoelectronically replaced by lighter oxo groups, $A(M^{II}O_{1.5})_x(M^{II}PO_4)_{1-x}$, thereby providing even higher theoretical capacity than the $AMPO_4$. The oxo-phosphates can also possess higher electronic conductivity and exhibit more rapid ion diffusion than the phosphates. In one embodiment, these materials can have compositions intermediate between $LiFePO_4$ and $Li_2Fe_2O_3$; however they are not simply biphasic mixtures of these two phases and they are not structurally related to them. Rather, they adopt new open framework structures very different from the simple iron phosphate and oxide analogs. These metal oxo-phosphates can combine the best properties of both "end compositions" with respect to the high voltage and open framework of the phosphate and the low mass and high capacity of the oxide.

Disclosed materials can provide large increases in capacity relative to previously known materials such as $LiFePO_4$, while maintaining the desired voltage, rate and capacity characteristics needed in a practical HEV or PHEV battery. It is believed that a correlation exists between structure and properties of the disclosed ion-containing metal phosphates and oxo-phosphates, and that performance parameters are dictated by the inductive effect of phosphate anions, multi-phase redox cycle (such as two-phase character in $LiFePO_4$/$FePO_4$), and the enhanced electronic conductivity of the framework.

The chemical system disclosed herein, which can include in one embodiment integrated oxo and phosphate frameworks, can offer tunable carrier (mobile electron polaron or hole polaron) density and optimized electronic/ionic conductivity. This is due to the fact that the disclosed materials, and in one particular embodiment, the oxo-phosphates, can include extended, mixed-valent oxo sublattices that can induce higher electronic conductivity as compared to other phosphates by increasing the number of charge carriers. Studies discussed further within have shown compounds of this type can exist with sizable channeled structures and facile room-temperature ion intercalation/insertion properties in aqueous solutions, indicating good ion transport and ionic conductivity.

According to one embodiment, the starting compound for forming disclosed materials can be a member of the ($Cs_{9-x}$, $K_x$)$Fe_7(PO_4)_{10}$ series that has been isolated from a high-temperature (750° C.) reaction employing the eutectic CsCl/KCl molten salt. For example, the polycrystalline starting material can be prepared in a stoichiometric reaction via conventional solid-state method.

According to one preferred embodiment, the starting compound can be $Cs_5K_4Fe_7(PO_4)_{10}$, which adopts a three-dimensional framework with two orthogonal channels that are interconnected. This particular compound can exhibit excellent ion exchange characteristics with all the monovalent alkali metals as well as with silver cations, likely due to the facile pathways.

Figure 3:
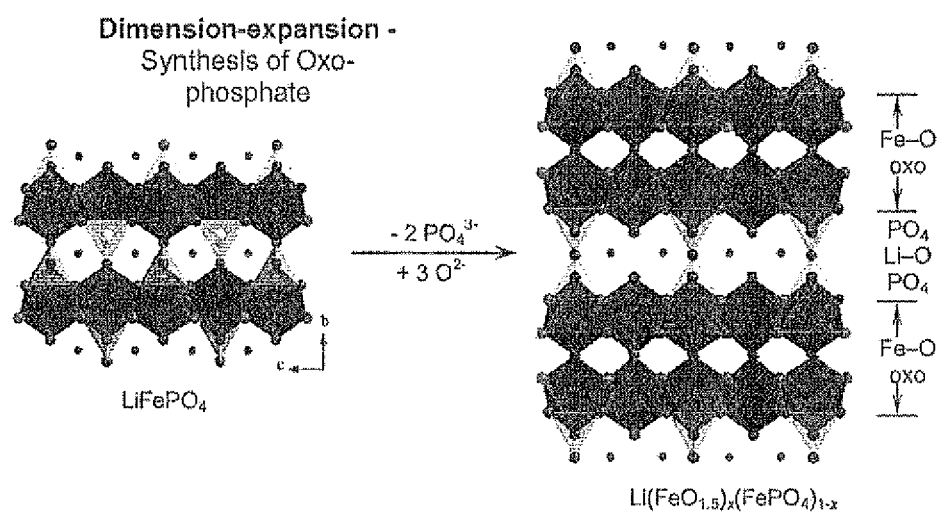
FIG. 3 is a schematic representation of proposed synthesis of lithium oxo-phosphate analogs as described herein.

A product can be formed via direct ion exchange of the starting compound under hydrothermal conditions at about 200° C. Both compounds adopt three-dimensional structures as shown in FIG. 3 that consist of orthogonally interconnected channels where electropositive ions reside. It is believed that the fully ion-exchanged product cannot yet be synthesized by conventional high-temperature, solid-state methods. Moreover, a small particle polycrystalline starting material, conceivably because of its reduced particle size, can allow for the full ion exchange of the sample.

Disclosed methods and products can utilize environmentally friendly Fe(II,III) phosphate chemical systems in which the channel structures are "templated" by alkali metal cations that are larger than the cation desired for the final product, e.g., lithium. Following ion exchange, framework bonds larger than typical A-O can form that can allow faster ion conductivity, and in one particular embodiment, faster Li-ion conductivity, an important variable in such systems.

When considering a lithium exchanged product, such as $Li_9Fe_7(PO_4)_{10}$, in comparison to iron(III) phosphate, $FePO_4$ disclosed materials can have a reductive decomposition potential approximately 200 mV lower and can show much better reversibility. This may result from the more lithium rich matrix formed on initial reduction and composite matrix formation. The comparison is consistent with the reported data on the iron(II) phosphate $LiFePO_4$, where similar reduction potentials to $Li_9Fe_7(PO_4)_{10}$ have been reported. Because the cell volume of the fully Li-exchanged sample is closely related to that of the parent compound, which has channels occupied by much bigger alkali metal cations, high ionic conductivity can be attained.

During formation, the larger alkali cations can serve as a "template" to maximize the size of the open-frameworks where smaller cations such as lithium can ultimately reside. This can allow for facile ion-exchange and ion-transport in the structures. Another factor promoting ion-exchange is to have weak A-O bonding. The large cations can have weaker A-O bonding due to the longer distance between the A-site cation and the oxide anion, and, therefore, are subject to preferred ion-exchange with smaller ions, such as $Li^+$ and $Na^+$. As a result of substantial size difference, performing soft chemistry can not only allow for ion exchange, but possibly insertion of additional small ion into the structure upon reduction. Optimizing the number of small cations in the structure can create a high capacity and allow additional stability of the iron-oxo-phosphate structure during the ion cycling, in turn creating a battery with a longer life.

Disclosed frameworks can include environmentally friendly transition metals (Fe, Mn) and polyanions ($PO_4$). In current cathode materials, transition metals start out in the discharged (reduced) state. During the delithiation process the metal becomes oxidized until the cation, e.g., lithium, is fully removed from the structure. To achieve full delithiation necessary for a high capacity, one needs to create cathode materials in which structural integrity is maintained during the charging process. In many materials, structures begin to collapse as the cations are removed from the layers or channels. To overcome this problem, disclosed compounds can be created in the oxidized state, then, through ion-exchange/insertion, additional cations can be inserted into the structure while simultaneously reducing the transition metal. This is advantageous because now the compound can be delithiated in full ($Fe^{2+} \rightarrow Fe^{3+}$) without collapse because original cation sites can remain occupied by the cations.

According to one embodiment, ion exchanged products can be formed under mild hydrothermal conditions at 150–200° C., and ion-exchange as well as redox intercalation can take place stoichiometrically in a nitrate solution with known concentration.

One preferred example can be demonstrated as follows:

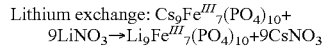
Lithium exchange: $Cs_9Fe^{III}_7(PO_4)_{10}$+
9$LiNO_3 \rightarrow Li_9Fe^{III}_7(PO_4)_{10}$+9$CsNO_3$

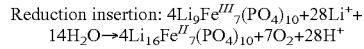
Reduction insertion: 4$Li_9Fe^{III}_7(PO_4)_{10}$+28$Li^+$+
14$H_2O \rightarrow$ 4$Li_{16}Fe^{II}_7(PO_4)_{10}$+7$O_2$+28$H^+$ According to another embodiment, disclosed compounds can include derivatives of phosphate compounds discussed above. For instance, analogs having the general formula $A_nM_nO_{3x}(PO_4)_{n-2x}$, where A=mono- or divalent electropositive cations (e.g., Li), M is either Fe or Mn, and x is between 0 and n/2 are encompassed in the present disclosure. For example, employing the disclosed approach and conditions, other oxo materials with general formula $A_aM_bO_c(PO_4)_d$ (a≥b) can be formed, including $Li_7Fe_7O_2(PO_4)_8$ iron(III) oxo-phosphate via ion-exchange of $Cs_7Fe_7O_2(PO_4)_8$ and iron (II) oxo-phosphate $Li_{14}Fe_7O_2(PO_4)_8$ through reduction insertion in $LiNO_3$ solution or in n-BuLi.

In addition to the A-O bonds of the lattice, the Fermi level of the $Fe^{3+}/Fe^{2+}$ redox couple in disclosed iron phosphates is also strongly affected by the connectivity of the Fe—O lattice. According to Goodenough et al. ("New Cathode Materials for Rechargeable Lithium Batteries: The 3-D Framework Structures $Li_3Fe_2(XO_4)_3$ (X=P, As)," *J. Solid State Chem.* 1998, 135, 228-234), extensive sharing (face-, edge-, corner-) of the oxygen between the $FeO_n$ polyhedra, as would be expected of the oxo sublattice, lowers the redox couple of the transition metal vs. the alkali metal, e.g., $Li/Li^+$. This is caused by the Madelung energy being reduced, thus lowering the energy of the $Fe^{3+}/Fe^{2+}$ redox couple and generating a higher open circuit voltage (OCV). The Madelung energy is lower where the oxygen is farther away from the transition metal; therefore the trend shows that the Madelung energy decreases with increasing number of shared oxygen.

Accordingly, disclosed materials can include the analog oxo-phosphates, which include an increased number of shared oxygens. In one embodiment, disclosed oxo-phosphates can be synthesized via high-temperature (>600° C.) solid-state chemistry, to form starting materials that include ions larger than the ions of the final product, e.g., $Li^+$. Following formation of a starting material, ion exchange/insertion reactions can be performed via low-temperature (<200° C.) methods as described previously. For instance, $Li_{14}Fe^{II}_7O_2(PO_4)_8$, a recently discovered Li—rich oxo—phosphate that has a theoretical capacity of 293 mAh/g, can be prepared using n-butyl lithium via reduction-insertion of $Li_7Fe^{III}_7O_2(PO_4)_8$ prepared from the preceding $Li^+$-exchange of $Cs_7Fe^{III}_7O_2(PO_4)_8$. The starting material in this case, $Cs_7Fe^{III}_7O_2(PO_4)_8$, is an Fe(III)-containing solid synthesized at high temperature using large $Cs^+$ cations as template.

Disclosed compounds can also vary with regard to Fe/P ratios. For instance, in one embodiment, disclosed materials can include Fe/P ratios in the iron-oxide-rich (Fe/P>1) region of the phase diagram.

Previously known olivine-type $LiFePO_4$ has great potential as the state-of-the-art cathode material, however as discussed above, it also has limitations, including a relatively low capacity, a lack of adequate pathways for rapid lithium ion transport, and a lack of electronic conductivity. Due to their structural similarities, the disclosed metal phosphate and metal oxo-phosphate materials can offer improvements over $LiFePO_4$ in these areas.

Structural changes for disclosed compounds as compared to previously known olivine-type materials are schematically illustrated in FIG. 3. Cooperatively, expansion of the Fe—O oxo sublattice can be achieved by isoelectronic substitution of phosphate ($PO_4^{3-}$) with lighter weight oxide ($O^{2-}$) anions, to form e.g., $Li_nFe_nO_{3x}(PO_4)_{n-2x}$. Expansion of the open framework can be achieved by employing large template ions followed by $Li^+$-ion exchange, as previously discussed.

Moreover, as compared to the phosphate materials previously discussed, the Fe(III)-containing oxo-phosphates can undergo the reduction/insertion processes adding even more Li into the existing free space within large-size channeled frameworks templated by large alkali-metal cations. For example, recent exploratory solid-state synthesis has led to the discovery of a new $Cs^+$-templated iron(III) oxo-phosphate, $Cs_7Fe_7O_2(PO_4)_8$, found in a CsCl/CsI eutectic flux:

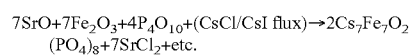
7SrO+7$Fe_2O_3$+4$P_4O_{10}$+(CsCl/CsI flux)$\rightarrow$2$Cs_7Fe_7O_2$ $(PO_4)_8$+7$SrCl_2$+etc.

Figure 4B:
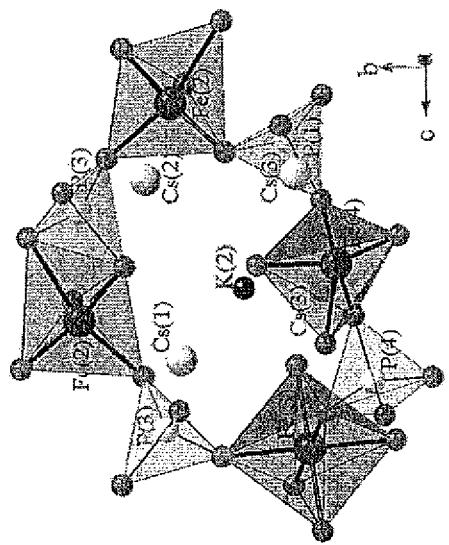
FIGS. 4A-4C are polyhedral representations showing large size windows in (5A) $Cs_7Fe_7O_2(PO_4)_8$, (5B) $(Cs,K)_9Fe_7(PO_4)_{10}$ and (5C) $(Cs,K)_9Fe_7(PO_4)_{10}$.
Figure 4C:
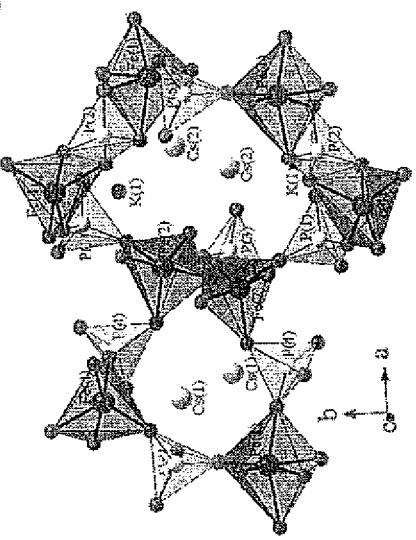
Figure 4A:
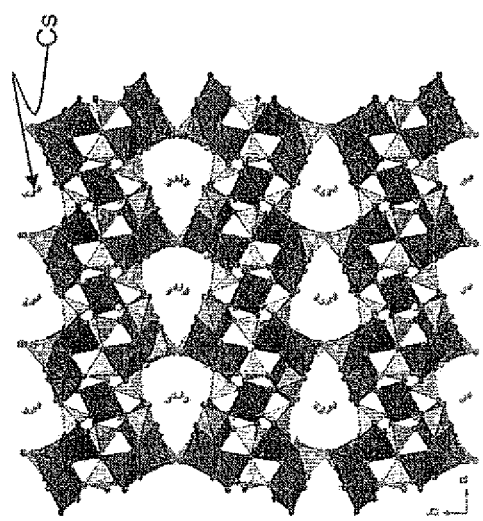

The source of Cs is from an in situ production of $Cs_2O$ through a possible metathesis reaction: $SrO+2CsX=SrX_2+Cs_2O$. In terms of the synthesis of $Cs_7Fe_7O_2(PO_4)_8$, as indicated in the chemical equation, the reaction is stoichiometric. Molten salt reactions, like the one illustrated above, usually lead to the growth of sizable single crystals and preliminary studies have shown that incorporation of $Sr^{2+}$ is possible only when the employed molten halides (flux) consist of monovalent cations smaller than $Sr^{2+}$, such as $Na^+$. The incorporation of $Sr^{2+}$ in oxo-phosphates is presumably because the NaCl salt (m.p.=801° C.) has a relatively higher lattice energy than CsCl/CsI due to size mismatch. By the same token, $Cs^+$ would be less stable in chloride lattice than in large-size oxo-phosphate channels (FIG. 4A), leading to the formation of Cs-incorporated $Cs_7Fe_7O_2(PO_4)_8$. In any event, this discovery is of importance to the study of channeled open-framework structures templated by large alkali-metal cations since the corresponding oxides are not commercially available.

Meanwhile, for the study of disclosed iron(II) oxo-phosphates $A(Fe^{II}O_{1.5})_x(Fe^{II}PO_4)_{1-x}$, the same approach can be used, employing stoichiometric amount of FeO and $P_4O_{10}$ according to the following equation:

$$2A'O+4FeO+(1-x)P_4O_{10}+(ACl/Al)\rightarrow 4A(Fe^{II}O_{1.5})_x(Fe^{II}PO_4)_{1-x}+2A'Cl_2+etc.$$

Reactions can be carried out in carbon-coated, fused silica ampoules under vacuum. The eutectic ACl/Al salt flux can be equivalent to 3× the weight of the oxides. The reaction temperature can typically be set at 100~150° C. above the melting point of the eutectic salt to give a broad enough window for crystal growth. Slow cooling through the molten state of the flux can facilitate the growth of sizable crystals of the compounds.

Polycrystalline samples can be prepared via direct synthesis using the corresponding oxides, alkali-metal carbonate, iron(II) oxide, and mono-basic phosphate:

$$A_2CO_3+2FeO+(2-2x)(NH_4)H_2PO_4\rightarrow 2A(Fe^{II}O_{1.5})_x(Fe^{II}PO_4)_{1-x}CO_2(g)+(33x)H_2O(g)+(2-2x)NH_3(g)$$

This reaction can be carried out in air in an alumina crucible (as reaction container), and due to the stoichiometric synthesis the product can be declared free of $Sr^{2+}$ (or alkaline-earth metal) cations. The as-prepared sample can then be used to perform ion exchange and insertion for formation of desired electrode materials.

The present disclosure may be better understood with reference to the Example, set forth below.

EXAMPLE 1

Polycrystalline samples of $Cs_5K_4Fe_7(PO_4)_{10}$ 1 were synthesized from a mixture of $(NH_4)H_2PO_4$ (Mallinckrodt, 99%), $Fe_2O_3$ (Aesar, 99.9%), $Cs_2CO_3$ (Aesar, 99.9%), and $K_2CO_3$ (Aesar, 99%) with a stoichiometric molar ratio of 10:3.5:2.5:2. These reactants were ground together in air then the mixture was loaded into an alumina crucible. The reaction was heated to 750° C. at a rate of 2° C./min and held at that temperature for 2 days before being furnace cooled to room temperature. The sample was subject to regrind/reheat twice to increase the crystallinity and the yield of the product.

Ion exchange reactions were successfully carried out using the polycrystalline sample under mild hydrothermal conditions. Polycrystalline powders (ca. 100 mg) of 1 were immersed in 10 mL of 1 M $LiNO_3$ solutions and heated in a Teflon-lined hydrothermal bomb at 200° C. for 12 h then furnace cooled to room temperature. After heating, the sample was isolated by vacuum filtration followed by rinsing with distilled water and acetone.

Figure 5:
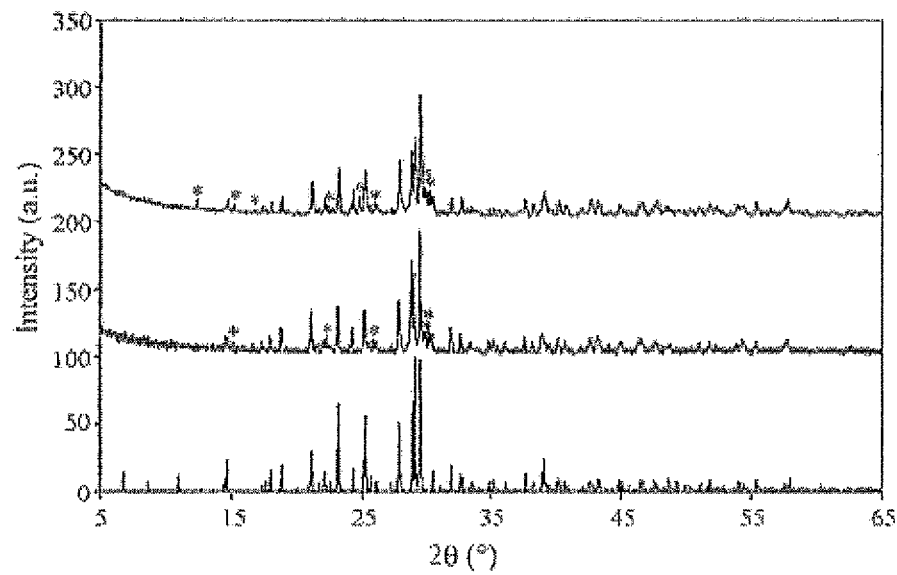
FIG. 5 illustrate a comparison of the calculated single crystal solution of $Cs_5K_4Fe_7(PO_4)_{10}$ (bottom), a stoichiometric polycrystalline sample (middle), and a $Li^{+1}$ exchanged polycrystalline sample (top) (the * signifies non-matching peaks)

The polycrystalline sample was examined on a SCINTAG XDS 2000 powder diffractometer that was equipped with a solid-state Ge detector with Cu Kα radiation (1.5406 Å). The sample was examined in the 2θ range of 5-65° with a 0.03° step size (FIG. 5). The powder X-ray diffraction (PXRD) pattern was refined using the general structure analysis system (GSAS) program. The resulted cell parameters are listed in Table 1, below, for a comparison, along with those of 1 acquired from the single crystal X-ray diffraction (SXRD) data. Table 1 includes unit cell parameters of the single crystal (x=0.35) and the polycrystalline sample (with fixed x=0 in profile refinement) of 1 and the $Li^+$-exchanged polycrystalline sample $Li_9Fe_7(PO_4)_{10}$ 2. The table shows that the unit cell parameters of the refined PXRD patterns closely resemble the SXRD solutions. The product from the stoichiometric reaction does have a higher Cs/K ratio than the SXRD sample, which accounts for the larger cell volume. This, in addition to the negligible volume contraction (by −0.2% of the unit cell 1) upon $Li^+$ ion exchange, testifies to the robustness of the iron-phosphate framework. The extra peaks (marked by * in FIG. 5) in the PXRD pattern of $Li_9Fe_7(PO_4)_{10}$ could be due to either unidentified impurity phases or a lowering of symmetry.

TABLE 1

|  | 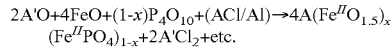 $Cs_{5-x}K_{4+x}Fe_7(PO_4)_{10}$ | | $Li_9Fe_7(PO_4)_{10}$ |
|---|---|---|---|
|  | SXRD | PXRD | PXRD |
| a (Å) | 13.896(3) | 13.917(3) | 13.902(6) |
| b (Å) | 16.396(3) | 16.443(3) | 16.443(6) |
| c (Å) | 9.827(2) | 9.830(2) | 9.821(4) |
| β ° | 110.42(3) | 110.59(1) | 110.58(1) |
| V (Å³) | 2098.3(7) | 2106(1) | 2102(2) |

Figure 6:
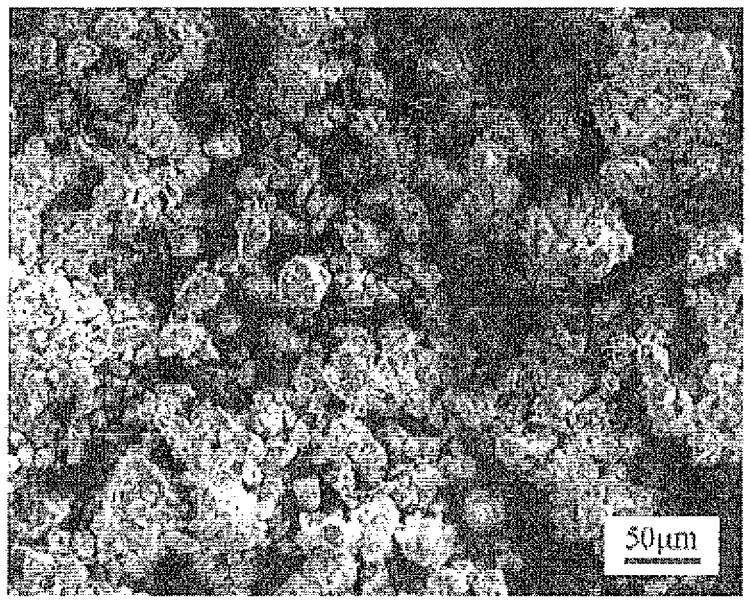
FIG. 6 is a scanning electron micrograph (SEM) showing the morphology and particle size of the crystalline material $Li_9Fe_7(PO_4)_{10}$.

The chemical contents were confirmed via semi-quantitative elemental analysis by the energy dispersive X-ray (EDX) spectroscopy using a Hitachi S-3400 scanning electron microscope (SEM) equipped with an OXFORD EDX microprobe. The results show that both samples consist of elements (with the exception of Li) in question and 2 shows no Cs, consistent with the finding of the fully $Li^+$-exchanged structure. The SEM photo (FIG. 6) shows that the particle size of polycrystalline sample 2 ranged from 5 to 20 mm across the longest dimension.

Quantitative analysis employing inductively coupled plasma (ICP) was performed to determine the Li and Fe concentrations for the bulk material of 2. ICP was performed via a JY ULTIMA 2 plasma emission spectrometer using an argon flow for the plasma. The solution was prepared by taking 11.8 mg of the polycrystalline sample and placing it in 10 mL of concentrated $HNO_3$ (1% metal grade) then stirred and heated until the sample was dissolved. It was then diluted down using a 1% $HNO_3$ solution to the appropriate concentration (1.00 ppm for Li, 6.26 ppm for Fe) based on the chemical formula for fully $Li^+$-exchanged 2. The resulting concentrations were obtained from the measurements using calibration curves (not shown) showing, within the range of standard deviations, 1.05(3) ppm for Li and 6.26(5) ppm for Fe closely comparable with the values as calculated above.

Figure 7:
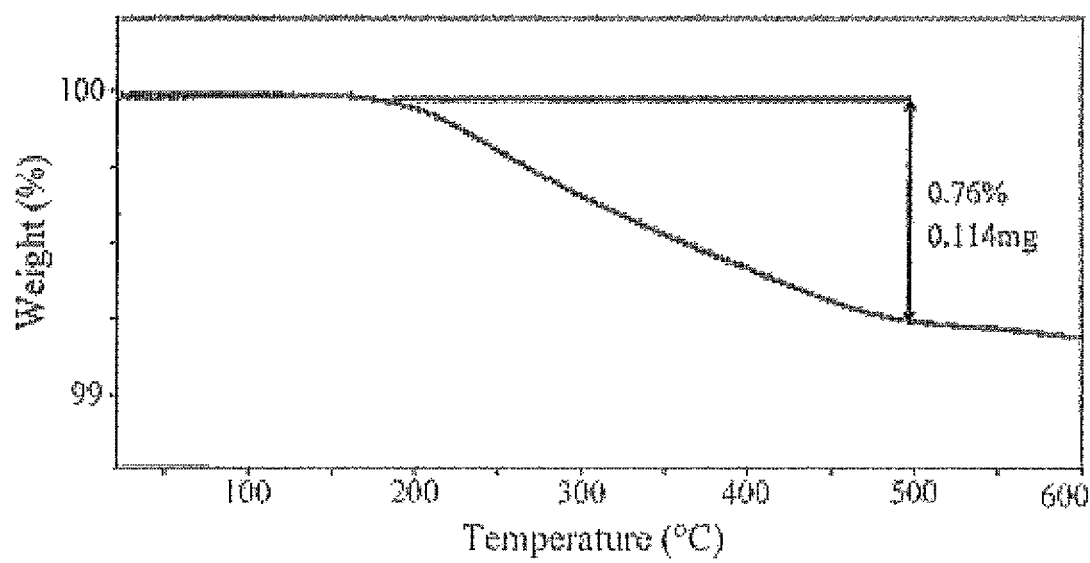
FIG. 7 illustrates the thermal gravimetric analysis (TGA) of $Li_9Fe_7(PO_4)_{10}$ showing the low-temperature thermal decomposition of the material.

Thermal gravimetric analysis (TGA) of 2 (14.978 mg $Li_9Fe_7(PO_4)_{10}$ sample) was carried out between room temperature and 600° C. under flowing nitrogen gas. FIG. 7 shows that the fully lithiated compound decomposes with a noticeable weight loss starting at as early as 175° C., which explains why it cannot be synthesized by conventional high-temperature, solid-state methods. The PXRD analysis of the TGA product(s) gives rise to a simple pattern yet to be determined.

For electrochemical evaluation, the materials were laminated on an aluminum current collector using a 70% electrochemical active sample, 15% poly(vinylidene difluoride) (PvDF) binder in n-methylpyrrolidinone (NMP), and ~15% carbon (50/50 mix of acetylene black and graphite). The electrode capacities were measured in 2032 button cells with a Li metal anode, Celgard PP/PE separators, and an electrolyte consisting of a 1.0 M LiPF$_6$ solution of a 50/50 mixture (by weight) of diethyl carbonate (DEC) and ethylene carbonate (EC). The voltage windows used (after preliminary testing) were 1.5-4.8 V (vs. Li) for 1 and 0.7-4.8 V for 2. Cycling was done with a 0.063 mA/cm$^2$ current using Maccor cyclers.

Figure 8:
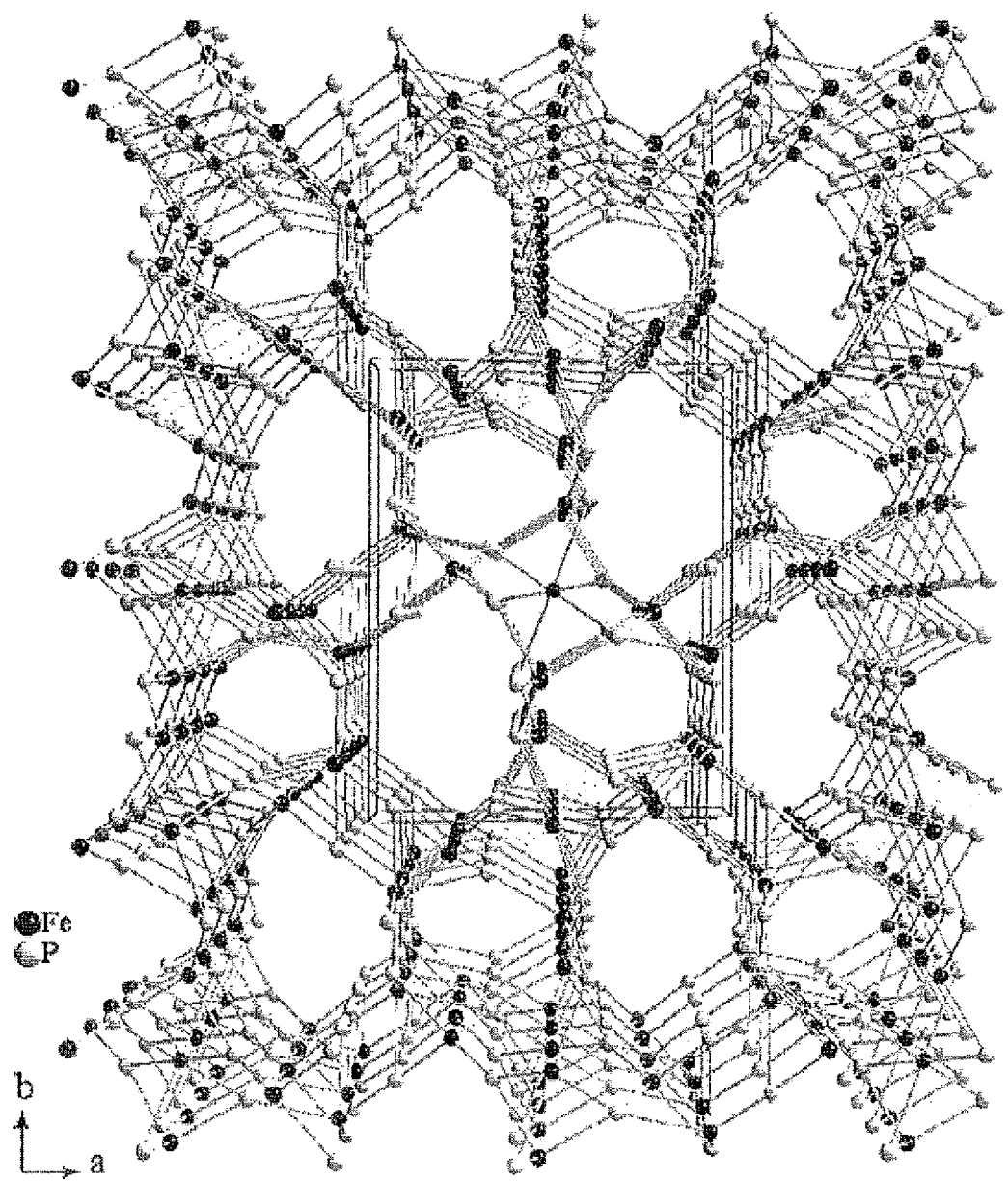
FIG. 8 is a perspective view of the network of polycrystalline $Cs_5K_4Fe_7(PO_4)_{10}$ showing the Fe—P channel structures along the c axis made of Fe—O and P—O polyhdra.

The X-ray single-crystal structure of 1 reveals a three-dimensional framework that consists of interconnected channels where the cations K$^+$ and Cs$^+$ reside. The channels feature the fused windows that exhibit 8- and 12-membered Fe—P rings (FIG. 8). The rings consist of vertex- and edge-shared polyhedra of three FeO$_5$ trigonal bipyramid units/one FeO$_6$ octahedron/four PO$_4$ tetrahedral units and four FeO$_5$/two FeO$_6$/six PO$_4$ polyhedral units, respectively. Along the orthogonal direction, the structure exhibits an additional set of channels containing an 8-membered Fe—O—P window made of three FeO$_5$/one FeO$_6$/four PO$_4$. Judging from the "compaction" of cations, good cationic conductivity is expected.

As has been previously shown, single crystal 1 can undergo ion exchange with all of the alkali metal cations, as well as silver. It has been shown herein that the polycrystalline Li-exchange product can be successfully used as an electrode material. The direct ion exchange of the single crystal material carried out under hydrothermal conditions in 1 M LiNO$_3$ solution for 12 h only yielded partial Li$^+$ substitution. Repeated ion exchange caused the crystals to breakdown and become polycrystalline. However, it has now been found that starting with polycrystalline solids can allow for a complete ion exchange to occur in as short as 12 h. This most likely is attributed to the shortened diffusion lengths brought about from reduced particle sizes by 1-2 orders of magnitude along the longest dimension. The product used for battery testing gives comparable PXRD patterns as shown in FIG. 5. Results from ICP and EDX experiments conclude that the polycrystalline product was fully Li$^+$-exchanged Fe(III) phosphate, Li$_9$Fe$_7$(PO$_4$)$_{10}$ 2.

Figure 9:
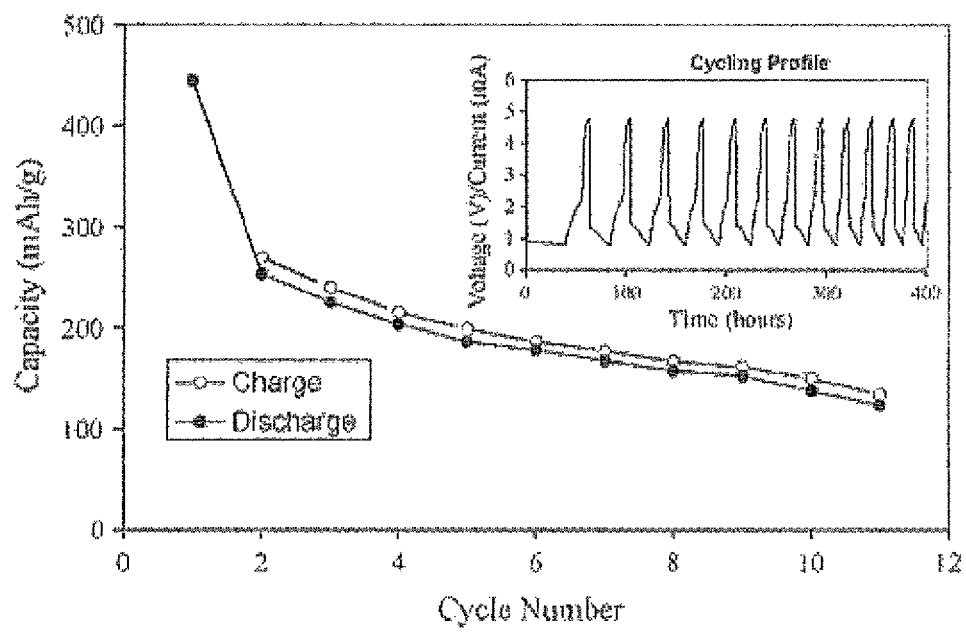
FIG. 9 illustrates the discharge and charge capacity curve of $Li_9Fe_7(PO_4)_{10}$, the inset shows the cycling profile of $Li_9Fe_7(PO_4)_{10}$ revealing that the discharge reaction occurs at 1.4 V and the charge at 1.8 V.
Figure 10:
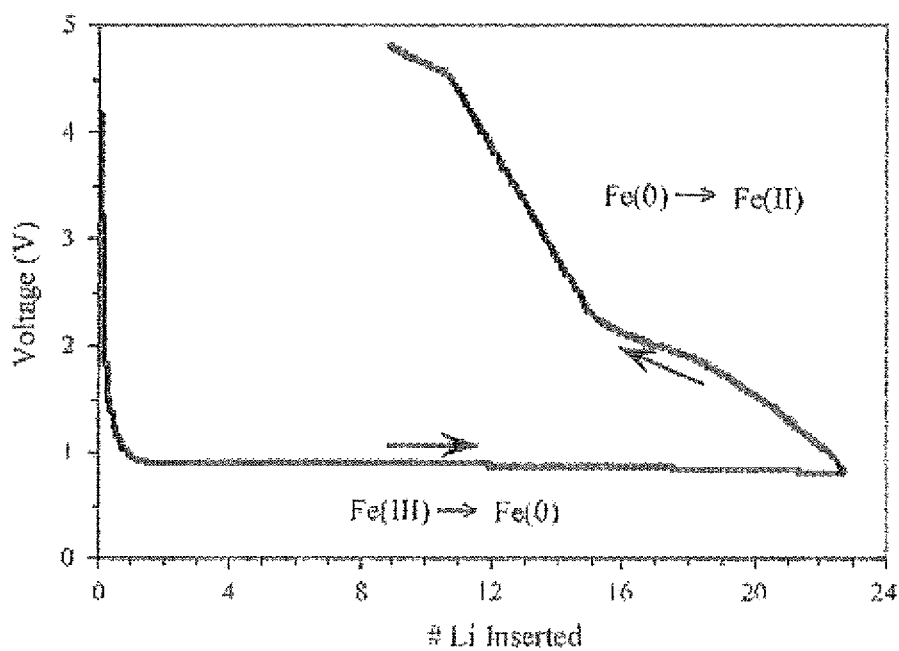
FIG. 10 illustrates the discharge curve for the first cycle of $Li_9Fe_7(PO_4)_{10}$ showing the number of $Li^+$ inserted per formula unit, and the amount of $Li^+$ is recovered on charge to 4.8V.

The Li$_9$Fe$_7$(PO$_4$)$_{10}$ samples were initially tested as a cathode material, based on similarities to the olivine-type electrode material LiFePO$_4$. In the electrochemical window used (up to 4.8 V), oxidation of the Fe(III) to Fe(IV) was not possible. However, from the discharge capacity it can be seen that 2 can be reduced and evaluated as an anode material. In the voltage window 0.7-4.8 V (vs. Li), sample 2 reveals a reversible cyclibility with an initial capacity of 250 mAh/g as shown in FIG. 9. This capacity would be equivalent to about thirteen Li atoms/formula unit (Li$_9$Fe$_7$(PO$_4$)$_{10}$, x=13) during possibly the charge/discharge process of Fe$^{2+}$+2e→Fe$^0$. The initial discharge capacity of approximately 450 mAh/g, corresponds to x=23 Li/formula unit, reflecting the complete reduction of the iron (21e's needed to reduce Fe(III), 2 for SEI formation) and the probable formation of an Fe/Li$_3$PO$_4$ composite matrix around 0.9 V vs. Li. FIG. 10 shows the voltage as the function of the number of Li$^+$ inserted per capacity. On charge, oxidation of the iron to FeO (or alternatively a Li—Fe(II)—O material) occurs possibly via Fe+Li$_2$O→FeO+2Li and subsequently the cell cycles as an Fe(II)—Fe(0) couple (the 14 Li's, as shown in FIG. 10). In addition, the cycling profile (FIG. 9 inset) indicates that this oxidation occurs around 1.8 V. On subsequent cycles the Fe(II) reduction occurs around 1.4 V. The higher reduction potential probably can be attributed to a combination of shorter diffusion lengths in the micron sized particles, proximity to Li$_3$PO$_4$ ionic conductors, and lower overall cell impedance.

FIG. 9 also shows moderate capacity fading, which is dependant both on the particle size, diffusion distances, and on the ionic transport properties of the Fe/Li$_3$PO$_4$ matrix. The later is likely attributed to the early destruction of the crystalline Fe(III) phosphate during the initial reduction (discharge) process as well as subsequent cycling between Fe(0) and Fe(II).

Electrochemical results indicate that Li$_9$Fe$_7$(PO$_4$)$_{10}$ is reduced below 1 V (vs. Li) to most likely form a Fe(0)/Li$_3$PO$_4$ composite material, which can subsequently be cycled reversibly at relatively low potential. Furthermore, 2 shows a lower reduction potential (0.9 V), by approximately 200 mV, and much better electrochemical reversibility than iron(M) phosphate, FePO$_4$, highlighting the value of improving the ionic conductivity of the sample.

It will be appreciated that the foregoing examples, given for purposes of illustration, are not to be construed as limiting the scope of this disclosure. Although only a few exemplary embodiments of the disclosed subject matter have been described in detail above, those skilled in the art will readily appreciate that many modifications are possible in the exemplary embodiments without materially departing from the novel teachings and advantages of this disclosure. Accordingly, all such modifications are intended to be included within the scope of this disclosure. Further, it is recognized that many embodiments may be conceived that do not achieve all of the advantages of some embodiments, yet the absence of a particular advantage shall not be construed to necessarily mean that such an embodiment is outside the scope of the present disclosure.

What is claimed is:

1. A method for forming an electrode or electrolyte material comprising:
   carrying out an ion exchange process on a starting material, the starting material having the formula:

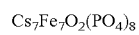

the ion exchange process exchanging the Cs cation component of the starting material with a smaller cation A* to form a product electrode or electrolyte material having the formula:

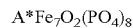

wherein the ratio of A* to Fe in the product is greater than one.

2. The method according to claim 1, wherein the smaller cation A* is lithium.

3. The method according to claim 1, wherein the ion exchange process is carried out under hydrothermal conditions at a temperature of between about 150° C. and about 200° C.

4. The method according to claim 3, wherein the ion exchange process is carried out in a solution of LiNO$_3$ or n-BuLi.

5. The method according to claim 1, wherein the starting material is formed according to the following reaction scheme:

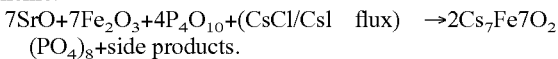

\* \* \* \* \*

UNITED STATES PATENT AND TRADEMARK OFFICE
CERTIFICATE OF CORRECTION

| | | |
|---|---|---|
| PATENT NO. | : 9,077,037 B2 | Page 1 of 1 |
| APPLICATION NO. | : 13/201238 | |
| DATED | : July 7, 2015 | |
| INVENTOR(S) | : Hwu et al. | |

It is certified that error appears in the above-identified patent and that said Letters Patent is hereby corrected as shown below:

In the Specification

Column 1, lines 19 - 21 states,

"The Federal Government may have rights in this invention disclosed herein pursuant to National Science Foundation (NSF) grant nos. DMR-0322905, and 0706426."

Please correct this paragraph to read as follows:

-- This invention was made with government support under grant #DMR0706426 and grant #DMR0322905, awarded by the National Science Foundation. The government has certain rights in the invention. --

Signed and Sealed this
Third Day of May, 2016

Michelle K. Lee
*Director of the United States Patent and Trademark Office*